(12) United States Patent
Leijnen

(10) Patent No.: US 12,388,335 B2
(45) Date of Patent: Aug. 12, 2025

(54) AXIAL FLUX MOTOR WITH FIELD WEAKENING FUNCTIONALITY

(71) Applicant: MAGNAX, Kortrijk (BE)

(72) Inventor: Peter Leijnen, Bachte-Maria-Leerne (BE)

(73) Assignee: MAGNAX, Kortrijk (BE)

( * ) Notice: Subject to any disclaimer, the term of this patent is extended or adjusted under 35 U.S.C. 154(b) by 206 days.

(21) Appl. No.: 18/272,661

(22) PCT Filed: Jan. 27, 2022

(86) PCT No.: PCT/EP2022/051923
§ 371 (c)(1),
(2) Date: Jul. 17, 2023

(87) PCT Pub. No.: WO2022/162076
PCT Pub. Date: Aug. 4, 2022

(65) Prior Publication Data
US 2024/0088765 A1 Mar. 14, 2024

(30) Foreign Application Priority Data
Jan. 29, 2021 (EP) .................................. 21154463

(51) Int. Cl.
*H02K 21/02* (2006.01)
(52) U.S. Cl.
CPC .................. *H02K 21/026* (2013.01)
(58) Field of Classification Search
None
See application file for complete search history.

(56) References Cited

U.S. PATENT DOCUMENTS

| | | | |
|---|---|---|---|
| 6,043,578 A | 3/2000 | Lamb | |
| 6,348,751 B1 | 2/2002 | Jermakian et al. | |
| 2007/0241628 A1 | 10/2007 | Himmelmann et al. | |
| 2009/0212728 A1 | 8/2009 | Yagi et al. | |
| 2012/0146445 A1 | 6/2012 | Tokoi et al. | |
| 2019/0288584 A1* | 9/2019 | Vansompel | H02K 9/227 |
| 2022/0286001 A1* | 9/2022 | Leijnen | H02K 1/20 |

FOREIGN PATENT DOCUMENTS

| | | | |
|---|---|---|---|
| EP | 1835600 A2 * | 9/2007 | ........... H02K 11/048 |
| JP | 2005168190 A | 6/2005 | |
| WO | 9428614 A1 | 12/1994 | |

OTHER PUBLICATIONS

Extended European Search Report from corresponding European Patent Application No. EP 21154463.0, Jul. 7, 2021.
International Search Report from corresponding PCT Application No. PCT/EP2022/051923, May 20, 2022.

* cited by examiner

*Primary Examiner* — Naishadh N Desai
(74) *Attorney, Agent, or Firm* — Workman Nydegger

(57) ABSTRACT

An axial flux machine includes a rotor having: a first and a second rotor disk; a shifting element; a first and a second pair of mechanical mating elements, enabling an axial displacement of the first respectively second rotor disk relative to the shifting element by rotating the first respectively second rotor disk. An equal rotation of the first and the second rotor disk results in an equally-sized but opposite axial displacement of the first and second rotor disk; a coupling element, mechanically coupling the first and the second rotor disk, thereby blocking a rotation of the first rotor disk relative to the second rotor disk while allowing for an axial displacement.

14 Claims, 13 Drawing Sheets

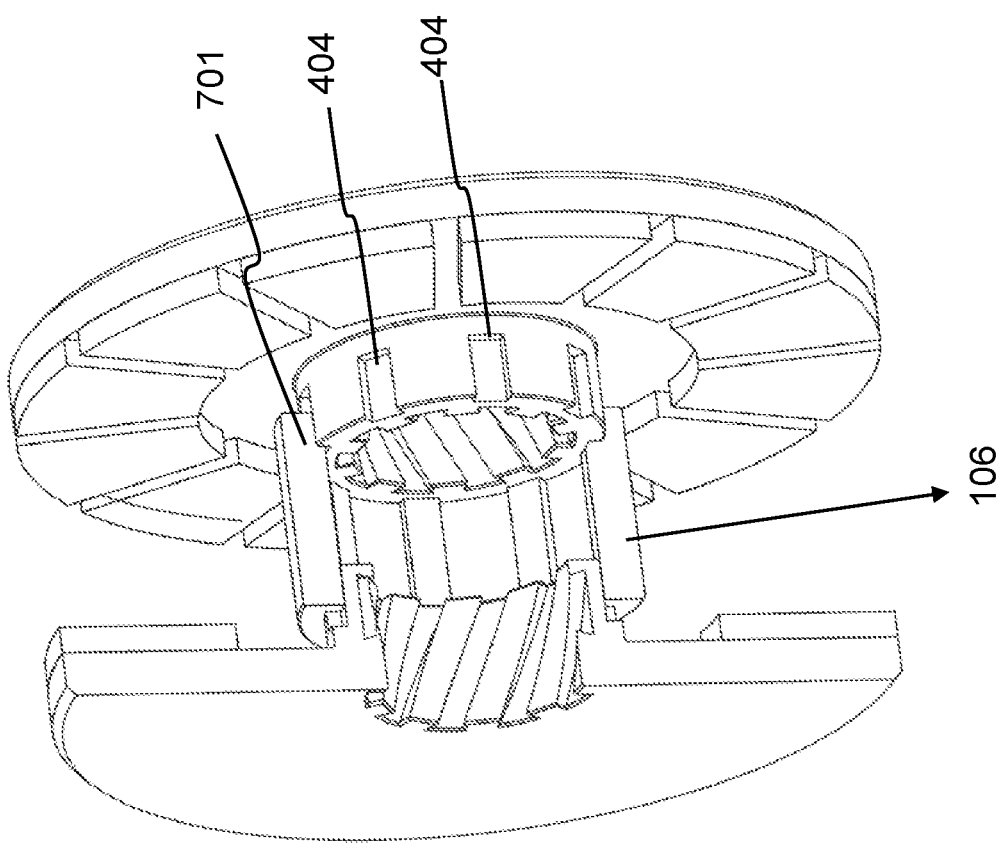
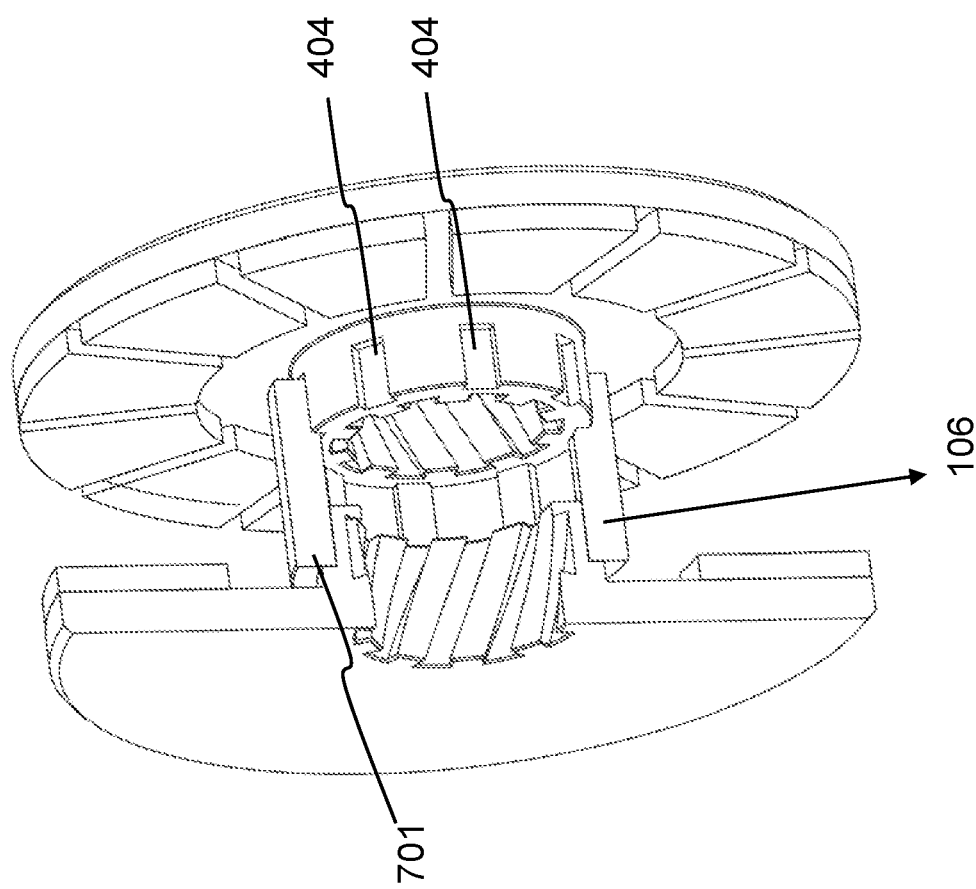
Fig. 8

AXIAL FLUX MOTOR WITH FIELD WEAKENING FUNCTIONALITY

FIELD OF THE INVENTION

The present invention generally relates to the field of axial flux machines. In particular, it relates to a mechanical mechanism allowing to apply field weakening in an axial flux machine having a topology with one stator and two rotors.

BACKGROUND OF THE INVENTION

An axial flux machine is a type of electrical machine wherein a flux is generated in axial direction, the latter being the direction of the rotational axis. Typically, an axial flux machine comprises a disk- or ring-shaped rotor and stator, both having a central axis corresponding to the rotational axis of the machine, the stator and rotor being axially spaced apart by a narrow air gap. The rotor comprises permanent magnets, generating an axial magnetic flux, while the stator comprises a plurality of coils in which currents may run. During motor operation, the rotor is driven by magnetic fields generated by the stator currents, while in generator condition currents are induced in the stator coils due to the rotation of the rotor. Different topologies are known for axial flux machines, for example comprising one rotor and stator, one rotor and two stators, or two rotor disks positioned on both sides of a stator.

Just like in other types of motors, the peak motor speed of an axial flux motor is limited by the maximum voltage level: during acceleration, the voltage level may increase until the maximum voltage of the power supply is reached, thereby preventing a further speed increase. A known principle to allow for a further acceleration is field weakening: by weakening the magnetic field, the motor characteristic is changed in such a way that a higher speed can be reached with a given voltage. Field weakening may be applied in an electronic way. For example, currents may be introduced into the stator that create magnetic fields opposed to the magnetic fields of the permanent magnets. However, this significantly reduces the efficiency and power of the motor at high speeds, being a main drawback of electronic field weakening.

For an axial flux machine, field weakening may also be applied in a mechanical way. Mechanical field weakening implies that the air gap between the rotor and stator is increased, typically by displacing the rotor or stator, thereby reducing the permanent magnetic field in the stator. For example, in US2009/0212728A1 the stator is axially shifted by means of a screw mechanism driven by an electric motor, thereby altering the stator's distance with respect to the rotor. Another example of mechanical field weakening is given in JP2005168190A, where a hydraulic piston is used for shifting the stator inside the motor's casing.

In prior art solutions like US2009/0212728A1 or JP2005168190A, mechanical field weakening is applied to an axial flux motor with basic topology, having one rotor and one stator. However, in a topology with two rotors, positioned at both sides of a stator, these known solutions cannot be applied. Indeed, as two air gaps are present, two actuators would be needed for displacing each of the rotor disks, e.g. two hydraulic actuators. Since it is essential that the length of both air gaps remain equal during displacement of the rotors, this also implies that two independent hydraulic supply lines are needed, which requires a rotating hydraulic coupling at both ends of the motor shaft. However, typically a gear box or a load is connected to one shaft end, thereby impeding placement of a hydraulic coupling at this shaft end. The need for two actuators therefore prevents a practical implementation. In the presented solutions for the basic topology, this is not an issue as only a single air gap is present.

In U.S. Pat. No. 6,348,751B1, a field weakening mechanism for an axial flux machine with two stators and one rotor is presented. Rotation of a first camming hub allows to axially move the first stator. Similarly, rotation of a second camming hub allows to axially move the second stator. Although both air gaps can be varied independently, by actuation of the first respectively the second camming hub, a pinion rod may be used to couple both actuations, such that rotation of one camming hub causes an equal rotation of the second camming hub. The mechanism presented in U.S. Pat. No. 6,348,751B1 cannot just be applied to a topology with one stator and two rotors. Indeed, displacing rotors instead of stators brings the additional complexity that rotors are mounted on a shaft, and displacement needs to take place during rotation of the rotors. Moreover, in the solution of U.S. Pat. No. 6,348,751B1 a gearing mechanism is needed to convert the rotating movement of an actuator to an axial displacement, thereby introducing additional complexity concerning a practical implementation of the system.

In EP1835600A3 a system is described for changing the axial gap between the stator and two respective rotor members. A second magnetic field is formed by the stator, which is used to generate an axial force adapted to move the rotor members in axial direction. For this purpose, two auxiliary rotors are provided, driven by the second magnetic field, and a power converting mechanism, arranged to convert torque of an auxiliary rotor into an axial force. The power converting mechanism e.g. makes use of a screw mechanism. Due to the second magnetic field, the auxiliary rotors rotate relatively to the shaft. Accordingly, the screw mechanism causes the auxiliary rotor to move axially, thereby pushing the main rotor and moving the latter in axial direction. In this solution, the auxiliary rotors serve as two separate actuators, adapted to exert an axial force on the main rotors. Therefore, the axial displacement of the main rotors will only be synchronised, if the actuation itself occurs in a synchronised way, which in EP1835600A3 is realised by means of the second magnetic field. This solution fully relies on the two auxiliary rotors, and on the second magnetic field allowing to actuate both auxiliary rotors at the same time. A very specific implementation is therefore required, and without the presence of the two auxiliary rotors, nothing guarantees a synchronous movement of the main rotors.

Finally, U.S. Pat. No. 6,043,578A1 discloses a magnetic coupling, allowing the coupling of two shafts without any direct mechanical connection between the shafts. A mechanism is described that allows to adjust the air gap between two magnet rotors. For displacing the magnet rotors, a barrel cam is used, having cam rollers projecting in cam slots. Turning the inner barrel causes an axial movement of the outer barrel, thereby pushing to a first magnet rotor. A second magnet rotor is connected to the first magnet rotor by means of a pivotable swing unit. Accordingly, by pushing the first magnet rotor in axial direction, the swing unit pivots, thereby causing the second magnet rotor to be pulled in opposite axial direction. U.S. Pat. No. 6,043,578A1 thus provides some kind of synchronisation mechanism, but in the application of a magnetic coupling. The solution relies on the pivoting swing unit, which may lack the robustness for use in other types of applications.

It is an objective of the present invention to disclose an axial flux machine, that resolves the above-described shortcomings of the prior art solutions. More particularly, it is an objective to present a solution that allows mechanical field weakening to be applied in an axial flux machine with one stator and two rotors, while continuously keeping both air gaps equal in length, and allowing for a practical implementation.

SUMMARY OF THE INVENTION

According to a first aspect of the present invention, the above identified objectives are realized by an axial flux machine defined by claim 1, comprising:
- a shaft having a rotational axis in axial direction;
- a stator having a central axis corresponding to the rotational axis, and comprising a plurality of coils, and
- a rotor comprising a first and a second rotor disk having a central axis corresponding to the rotational axis, wherein the first and the second rotor disk are mounted on both sides of the stator, each of the rotor disks being axially separated from the stator by an air gap and comprising permanent magnets, wherein the rotor comprises:
- a shifting element, rotatably mounted while secured in axial direction relative to the stator;
- a first and a second pair of mechanical mating elements, adapted to mate the shifting element and the first respectively second rotor disk, and enabling an axial displacement of the first respectively second rotor disk relative to the shifting element by rotating the first respectively second rotor disk relative to the shifting element, wherein an equal rotation of the first and the second rotor disk relative to the shifting element, results in an equally-sized but opposite axial displacement of the first and second rotor disk relative to the shifting element;
- a coupling element, mechanically coupling the first and the second rotor disk, thereby blocking a rotation of the first rotor disk relative to the second rotor disk while allowing for an axial displacement of the first rotor disk relative to the second rotor disk, and wherein:
- the first respectively second pair of mechanical mating elements comprises a first respectively second guiding spline, adapted to mesh with a corresponding spline comprised in the first respectively second rotor disk, the first guiding spline and the second guiding spline both being comprised in a cylindrical surface of the shifting element;
- the coupling element comprises a third guiding spline, adapted to mesh with a corresponding spline comprised in the first respectively second rotor disk, the third guiding spline being comprised in a cylindrical surface of the coupling element;
- the shifting element and the coupling element are separate elements mounted coaxially, the cylindrical surface of the coupling and shifting element having a central axis corresponding to the rotational axis.

Thus, the invention concerns an axial flux machine having a topology with one stator and two rotor disks. The rotor disks are mounted on both sides of the stator, and a first respectively second air gap, with length in axial direction, is present between the stator and the first respectively second rotor disk. An axial flux machine may equally be referred to as, for example, an axial air-gap electric motor or generator, or an axial flux permanent magnet machine. Typically, the machine is suited to operate as a motor and as a generator, depending on the working condition. According to different embodiments, different variants of the 'two rotor–one stator' topology are possible. For example, the axial flux machine may be of the torus type, having a stator yoke, or may be of the YASA type, not having a stator yoke. The latter machine is also referred to as, for example, a yokeless and segmented armature (YASA) motor or generator, or simply a yokeless axial flux machine.

The rotor is defined as an assembly of components that are rotating during operation of the machine. The term rotor disk refers to a component mounted on the shaft and comprising the permanent magnets. Typically, it comprises a ring- or disk-shaped part carrying the permanent magnets. Additionally, the rotor disk may comprise other parts, protruding from the surface of the disk-shaped part.

The rotor comprises a shifting element. The shifting element is rotatably mounted and is secured in axial direction relative to the stator. In an embodiment, the shifting element may be integrated in the motor shaft, or be a part of the motor shaft. In another embodiment, the shifting element is mounted between the motor shaft and the stator. For example, the shifting element comprises a cylindrical sleeve, mounted coaxially with the motor shaft.

The rotor further comprises a first and a second pair of mechanical mating elements. The first pair is adapted to mate the shifting element and the first rotor disk, while the second pair is adapted to mate the shifting element and the second rotor disk. Mechanically mating of two components refers to the coupling of those two components, in the sense that only specific movements of the components with respect to each other are possible. In other words, a pair of mechanical mating elements comprises two elements with a corresponding feature or complementary shape, that only may move relative to each other according to a specific trajectory, the latter being defined by the corresponding features or shapes. In particular, the mating of the shifting element and the respective rotor disk is such that a rotation of the rotor disk relative to the shifting element results in an axial displacement of the rotor disk relative to the shifting element.

The first pair of mechanical mating elements comprises a first guiding spline, adapted to mesh with a corresponding spline comprised in the first rotor disk. The second pair of mechanical mating elements comprises a second guiding spline, adapted to mesh with a corresponding spline comprised in the second rotor disk. Both the first guiding spline and the second guiding spline are comprised in a cylindrical surface of the shifting element. In general, a spline or guiding spline refers to the presence of teeth, ridges or grooves on a component, being adapted to mesh with corresponding teeth, ridges or grooves in a mating piece. The spline in the component and the spline in the mating piece have a complementary shape, thereby defining a particular trajectory when moving the mating piece relative to the component. In the invention, the splines comprised in the shifting element and rotor disk define the axial movement of the rotor disk relative to the shifting element while rotating the rotor disk relative to the shifting element. For example, helical splines may be used, comprising helical grooves and corresponding teeth. In another embodiment, a ball spline may be used. For example, a groove describing a helical path is present in both the shifting element and the rotor, between which rolling elements, like in a ball or roller bearing, are provided.

Furthermore, the two pairs of mechanical mating elements are such that an equal rotation of the first and the second rotor disk relative to the shifting element, results in an equally sized but opposite axial displacement of the first and second rotor disk relative to the shifting element. This means that when the angular position of both the first and the second rotor disk is changed in the same way, i.e. in the same sense and with an equal angle, both rotor disks are axially displaced over the same distance, but in opposite sense. Various embodiments are possible. For example, a first helical spline in clockwise direction and a second helical spline in counter-clockwise direction may be provided on the shifting element, both splines describing a spiral with equal pitch.

The rotor further comprises a coupling element. The coupling element mechanically couples the first and the second rotor disk in such a way that a rotation of the first rotor disk relative to the second rotor disk is blocked, while an axial displacement of the first rotor disk relative to the second rotor disk is possible. This means that on the one hand the coupling element mechanically connects the first and the second rotor disk, and on the other hand, corresponding features provided in the coupling element and the rotor disks define an axial trajectory along which a rotor disk can move relative to the coupling element.

The coupling element comprises a third guiding spline, adapted to mesh with a corresponding spline comprised in the first respectively second rotor disk, thereby mechanically coupling the first rotor disk to the second rotor disk in such a way that an axial displacement of the first rotor disk relative to the second rotor disk is allowed while a rotation of the first rotor disk relative to the second rotor disk is blocked. The third guiding spline is comprised in a cylindrical surface of the coupling element. The term 'third' guiding spline is used to clearly distinguish from the aforementioned 'first' and 'second' guiding spline comprised in the shifting element, but has to be understood as an independent characteristic of the coupling element. Several embodiments are possible. For example, the third guiding spline may comprise one or more elongated elements or bars, extending between both rotor disks and meshing with corresponding grooves in the rotor disk. In another embodiment, a tongue-and-groove type connection may be established by providing straight grooves in the rotor and corresponding straight ribs in the coupling element. In yet another embodiment corresponding straight grooves may be provided in both the coupling element and the rotor disk, between which rolling elements like in a ball or roller bearing, are placed. In yet another embodiment, the coupling element comprises a cylindrical sleeve, mounted coaxially with the rotor disks, and the third guiding spline is a parallel key spline, comprising straight grooves in axial direction. In any of these embodiments, the shape of the splines in the coupling element and rotor disks is such that the first and second rotor disk may axially move relative to each other, but no rotation relative to one another is possible.

The shifting element and the coupling element are separate elements, meaning that they are individual elements, and are not connected to each other. The shifting element and the coupling element are mounted coaxially, such that the cylindrical surface of the coupling and the cylindrical surface of the shifting element have a central axis corresponding to the rotational axis. For example, the coupling element and the shifting element each comprise a cylindrical sleeve, of which the diameter may be larger for the coupling element than for the shifting element, or vice versa. In an embodiment, the shifting element is integrated in the motor shaft, and the coupling element is mounted coaxially with the motor shaft.

The invention provides several advantages. Firstly, the shifting element and coupling element have a particular interaction. Indeed, the shifting element provides for a way to axially move a rotor disk relative to the shaft, during operation of the machine. However, this is not just an axial shift: any axial movement of a rotor disk goes along with a corresponding change of the angular position of the rotor disk relative to the shifting element. As the coupling element always keeps the angular position of both rotor disks the same, any rotation of one rotor disk relative to the shifting element automatically results in the same rotation of the other rotor disk, which is converted back into an equally-sized but opposite axial movement of the other rotor disk by the shifting element. Therefore, the particular interaction of the shifting element and coupling element results in a unique synchronisation mechanism, enabling to displace both rotor disks in a synchronous way. Consequently, using this synchronisation mechanism guarantees that both air gaps always remain the same during repositioning of the rotor disks. As the latter is an essential condition in machines with a 'two rotor–one stator' topology, the invention enables the application of mechanical field weakening in axial flux machines with such a topology.

Secondly, as the synchronisation mechanism ensures equality of both air gaps, actuation can be done in a simple way, thereby enabling a practical implementation of the field weakening functionality. Various embodiments are possible. For example, a single hydraulic actuator may be used, positioned centrally between both rotor disks, wherein an increase of the hydraulic pressure results in an axial force on the two rotor disks. In practice, initially that force may be absorbed by only one of the rotor disks. Without the invented synchronisation mechanism, this would cause the actuated disk to start moving, thereby decreasing the magnetic attraction to the stator, which in turn causes that disk to move further away from the stator, again lowering the magnetic attraction and so on; the other rotor disk would just remain in its original position, as no actuating force is left to initiate his movement. However, due to the synchronisation mechanism, any initial movement of one rotor disk will automatically result in a synchronous movement of the other rotor disk. Returning to a position with decreased air gaps may simply rely on the magnetic attraction between rotor and stator. A single central hydraulic actuator only requires one hydraulic supply line, and one rotating hydraulic coupling at one end of the shaft, the latter not impeding the placement of a gear box or load at the other end. Therefore, the invention enables an easy integration into the design of the axial flux machine.

In another embodiment, actuation may even be done without any additional source of energy, simply relying on the change in torque exerted by the rotor: when evolving towards low-torque high-speed operation, a torque decrease automatically results in a change of the angular position of the rotor disk relative to the shifting element, causing the disk to move away from the stator. A counteracting element, like a spring pushing both rotor disks apart, may be used to overcome the magnetic attraction between a rotor disk and the stator. Again, use of the synchronisation mechanism ensures equality of the air gaps, and a simple integration in the axial flux machine is possible.

Optionally, as specified by claim 2, the axial flux machine comprises an actuator, the actuator comprising one or more axially displaceable parts, and adapted to push the first and the second rotor disk apart by an axial movement of the one or more axially displaceable parts. An actuator is defined as a component that is responsible for moving and controlling a mechanism or system. In general terms, an actuator requires a control signal and a source of energy; when receiving a control signal, the actuator responds by converting the source's energy into mechanical motion. In the invention, the actuator comprises one or more parts that are axially movable and that are in contact with or connected to one or both of the rotor disks. Actuation implies that an axial force is exerted on the one or both rotor disks, and an axial movement of the axially displaceable parts is initiated. Optionally, only one actuator, with a single source of energy is present in the axial flux machine. Several embodiments are possible. For example, the actuator may be a hydraulic actuator, wherein a hydraulic fluid under pressure acts as source of energy, and a changing pressure causes a change of volume of a chamber or piston placed between the two rotor disks. In another embodiment the actuator may be driven by an electrical source of energy, e.g. a screw mechanism driven by an electrical motor. In yet another embodiment the actuator may comprise a bimetal, adapted to convert a temperature change into a mechanical displacement.

Optionally, as specified by claim 3, the actuator comprises a first and a second axially displaceable wall, both positioned between the first and the second rotor disk, wherein the first respectively second wall is in contact with the first respectively second rotor disk. The first respectively second wall may be connected to the respective rotor disk, or may simply be pushing against it. When actuating, an axial force is exerted on both the first and the second rotor disk. Optionally, the axial displacement of the first wall and the axial displacement of the second wall are controlled by means of a common energy source.

Optionally, as specified by claim 4, the actuator comprises a fluid chamber adapted to receive a hydraulic fluid, wherein the fluid chamber comprises the first and the second axially displaceable wall, such that an axial displacement of the first and second rotor disk changes the volume of the fluid chamber. This implies that a hydraulic actuator is used, comprising a chamber or piston filled with a hydraulic fluid under pressure. Due to a pressure increase, the volume of the chamber is increased, thereby moving the walls of the chamber away from each other and pushing the rotor disks apart.

Optionally, as specified by claim 5, the volume of the fluid chamber is controlled based on a hydraulic pressure.

Optionally, as specified by claim 6, the shifting element is separate from the coupling element, thereby allowing for a rotation of the shifting element relative to the coupling element during an axial displacement of the first and second rotor disk.

Optionally, as specified by claim 7, the cylindrical surface comprising the first and second guiding spline faces the cylindrical surface comprising the third guiding spline. This means that the first and second guiding spline, which are comprised in the cylindrical surface of the shifting element, are directed towards the third guiding spline, the latter being comprised in the cylindrical surface of the coupling element. In an embodiment the first and second guiding spline are provided on a cylindrical outer surface of the shifting element, while the third guiding spline is provided on a cylindrical inner surface of the coupling element. In another embodiment the first and second guiding spline are provided on a cylindrical inner surface of the shifting element, while the third guiding spline is provided on a cylindrical outer surface of the coupling element.

Optionally, as specified by claim 8, the shifting element is integrated in the motor shaft. This means that the shifting element and the shaft form one entity, and the shifting element actually is a part of the shaft. In other words, mechanical mating elements comprised in the shifting element are provided on the motor shaft. For example, two helical splines may be provided on the shaft, in the form of grooves, ridges, or teeth provided in or on the cylindrical surface of the shaft. This reduces the need for additional components, thereby further contributing to a practical implementation and easy integration into the machine design.

Optionally, as specified by claim 9, the path of the first guiding spline describes a left-handed helix, and the path of the second guiding spline describes a right-handed helix. In this way, when equally changing the angular position of both rotor disks, the first guiding spline enables an axial movement of the first rotor disk in one direction, and the second guiding spline enables an axial movement of the second rotor disk in the opposite direction.

Optionally, as specified by claim 10, the third guiding spline comprised in the coupling is adapted to establish one or more tongue-and-groove connections between the coupling element and the first respectively second rotor disk. In this, the spline comprised in the coupling element may serve as tongues and the spline comprised in the rotor disks may serve as grooves, or vice versa.

Optionally, as specified by claim 11, the third guiding spline comprises one or more straight ribs extending in axial direction, said one or more ribs being adapted to mesh with one or more straight grooves comprised in the first and second rotor disk and extending in axial direction. This means that the ribs and grooves are substantially parallel to the axial direction, being the direction of the rotational axis.

Optionally, as specified by claim 12, the rotor further comprises one or more springs positioned between the first and the second rotor disk, the one or more springs adapted to push the first and the second rotor disk apart. The one or more springs act as a counteracting element, meaning that an axial force is generated counteracting the magnetic attraction between rotor and stator. In an embodiment, the one or more springs supplement the actuator, in the sense that, in addition to the axial force originating from the actuator, they help to push the rotor disks apart. In another embodiment the one or more springs may be the only element pushing the rotor disks apart, without any actuator being placed between the rotor disks. In the latter case, actuation may just rely on the change of torque from the rotor disks when evolving towards a high-speed low-torque operation or vice versa.

According to a second aspect of the present invention, the above identified objectives are realized by a method for realizing mechanical field weakening in an axial flux machine, defined by claim 13, the method comprising:

providing an axial flux machine having a rotational axis in axial direction, the axial flux machine comprising a stator and a rotor, the stator having a central axis corresponding to the rotational axis and comprising a plurality of coils, and the rotor comprising:

a first and a second rotor disk having a central axis corresponding to the rotational axis, wherein the first and the second rotor disk are mounted on both sides of the stator, each of the rotor disks being axially separated from the stator by an air gap and comprising permanent magnets, a shifting element, rotatably mounted while secured in axial direction relative to the stator;

a first and a second pair of mechanical mating elements, mating the shifting element and the first respectively second rotor disk, the first respectively second pair of mechanical mating elements comprising a first respectively second guiding spline, adapted to mesh with a corresponding spline comprised in the first respectively second rotor disk, the first guiding spline and the second guiding spline both being comprised in a cylindrical surface of the shifting element;

a coupling element, mechanically connecting the first and the second rotor disk, and comprising a third guiding spline, adapted to mesh with a corresponding spline comprised in the first respectively second rotor disk, the third guiding spline being comprised in a cylindrical surface of the coupling element;

wherein the shifting element and the coupling element are separate elements mounted coaxially, the cylindrical surface of the coupling and shifting element having a central axis corresponding to the rotational axis;

axially moving the first rotor disk relative to the shifting element by the first pair of mechanical mating elements, due to rotating the first rotor disk relative to the shifting element, and axially moving the second rotor disk relative to the shifting element by the second pair of mechanical mating elements, due to rotating the second rotor disk relative to the shifting element, wherein an equal rotation of the first and the second rotor disk relative to the shifting element, results in an equally-sized but opposite axial displacement of the first and second rotor disk relative to the shifting element;

blocking a rotation of the first rotor disk relative to the second rotor disk by the coupling element during the axial displacement of the first and second rotor disk.

Optionally, as specified by claim 14, the method further comprises:

providing an actuator comprising one or more axially displaceable parts;

axially moving the one or more axially displaceable parts, thereby pushing the first and second rotor disk apart.

BRIEF DESCRIPTION OF THE DRAWINGS

In FIG. 3, the coupling element has been intersected in the drawing.

FIG. 8, including FIGS. 8(a) and 8(b), shows a three-dimensional representation of a coupling element mounted on two rotor disks, according to an embodiment of the invention. For clearness of representation, the components have been partly intersected in the drawing.

FIGS. 9(a) and 9(b), shows a cross-section according to a plane comprising the rotational axis, of a stator and a coupling element mounted on two rotor disks, according to an embodiment of the invention FIG. 9 shows a cross-section according to a plane comprising the rotational axis, of a stator and a coupling element mounted on two rotor disks, according to an embodiment of the invention.

DETAILED DESCRIPTION OF EMBODIMENT(S)

Figure 1:
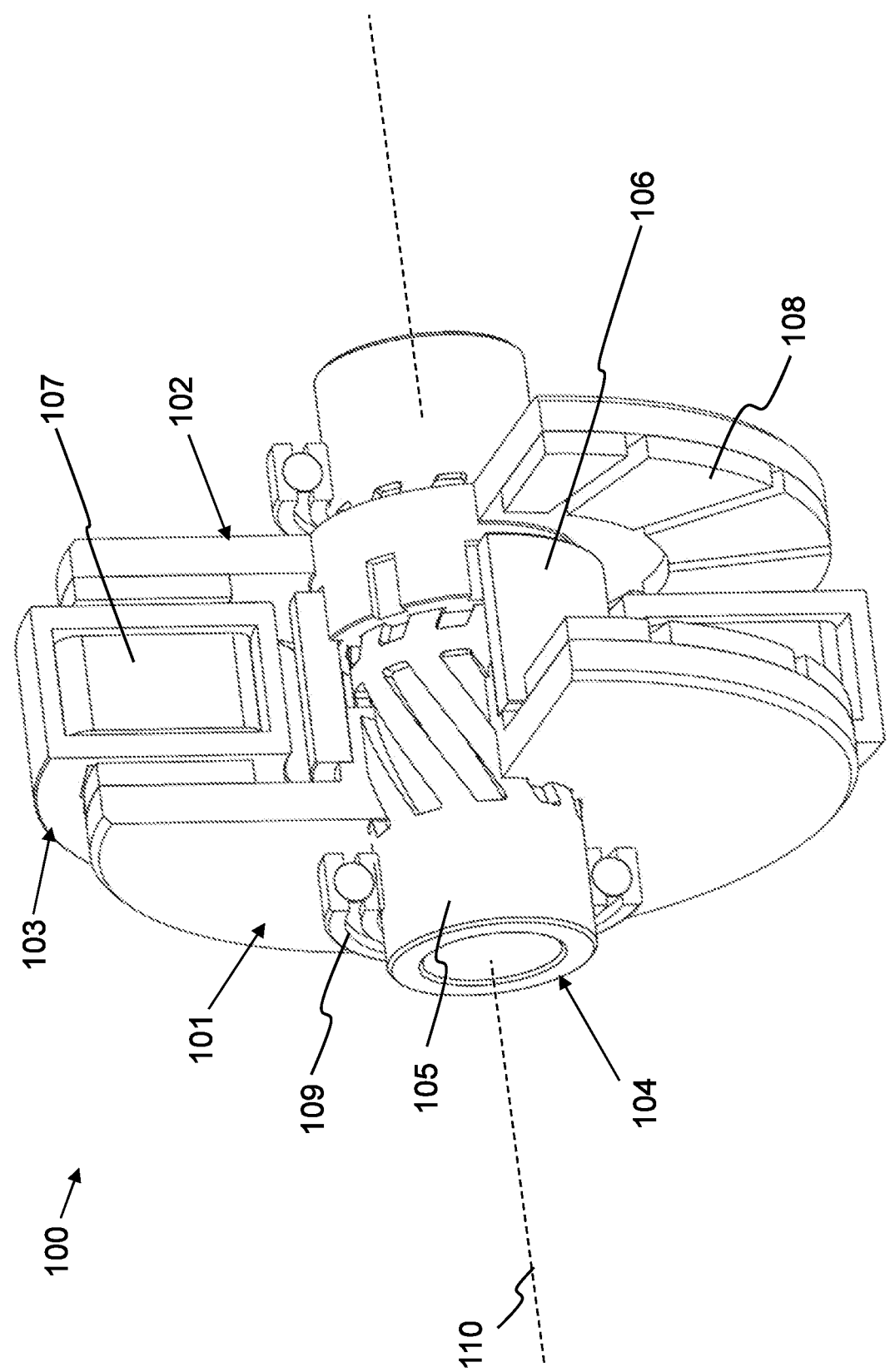
FIG. 1 shows a three-dimensional representation of an axial flux machine according to an embodiment of the invention. For clearness of representation, a part of the machine has been intersected in the drawing.

FIG. 1 shows an axial flux machine 100 according to an embodiment of the invention, comprising a motor shaft 104, a stator 103, a first rotor disk 101 and a second rotor disk 102. The machine 100 has a rotational axis 110, defining the axial direction. The stator 103 comprises coils 107, typically copper windings wound around a ferromagnetic core, and the rotor disks 101, 102 comprise permanent magnets 108. The rotor disks 101, 102 are mounted on the shaft 104, on both sides of the stator 103, leaving a small air gap between a rotor disk 101, 102 and the stator 103. Bearings 109 are provided to mount the shaft 104 rotatably in a static housing.

Figure 2:
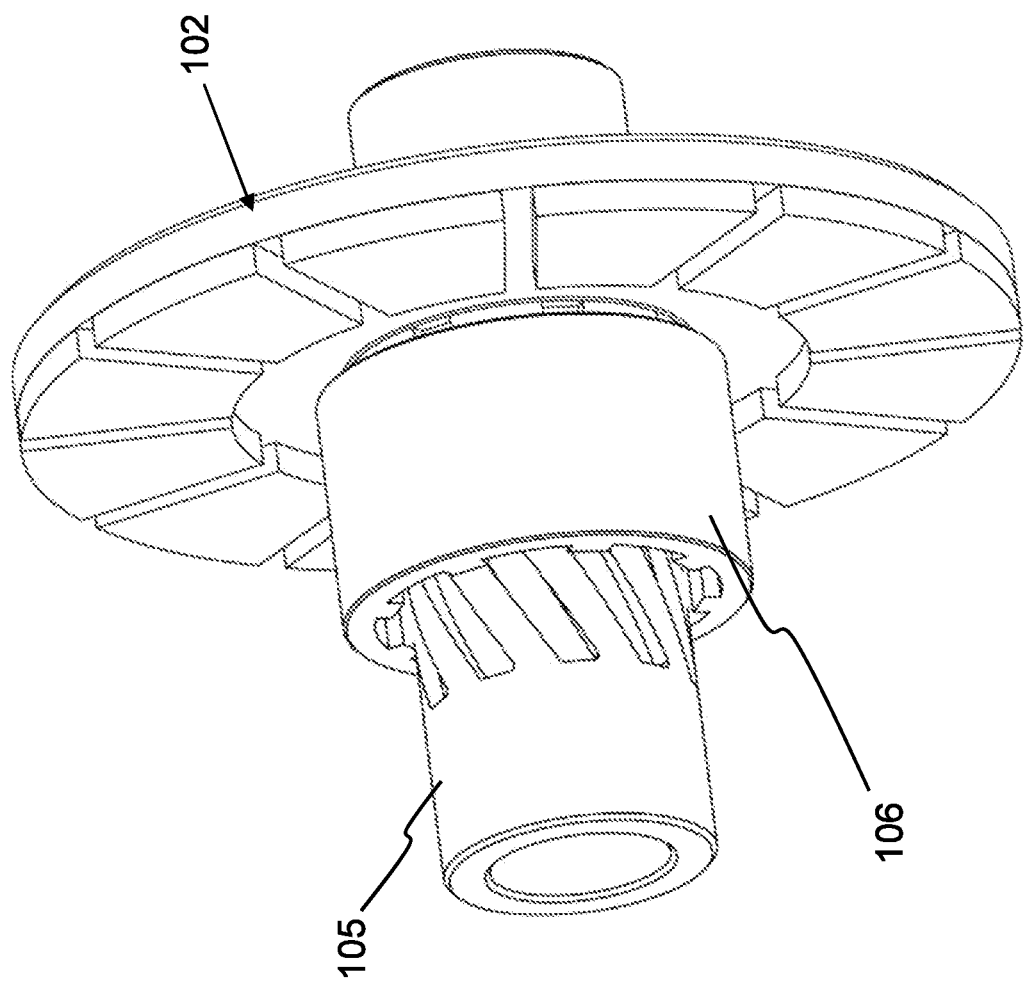
FIG. 2 and FIG. 3 show a three-dimensional representation of a shifting element, a coupling element and one of the rotor disks, according to an embodiment of the invention.
Figure 3:
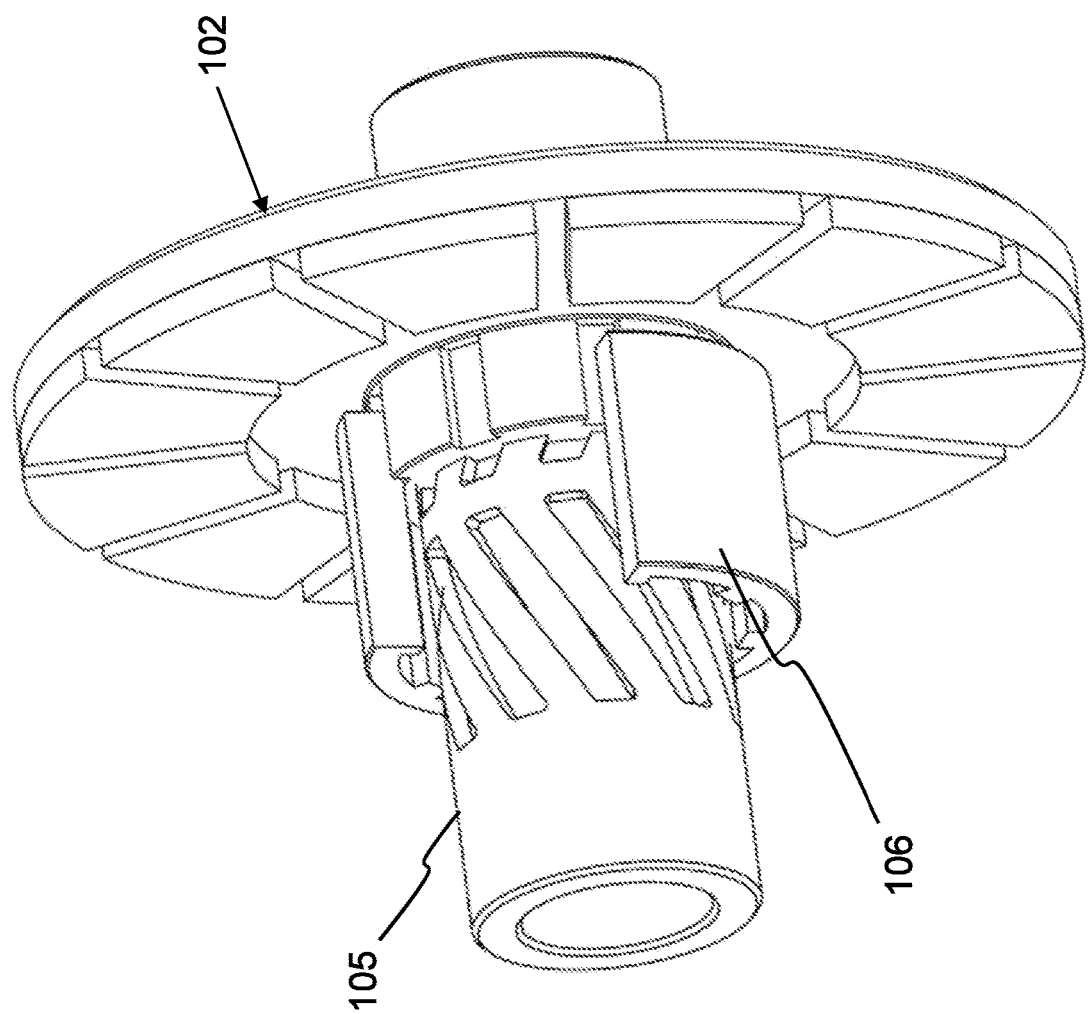

The axial flux machine 100 comprises a shifting element 105 and a coupling element 106. These two elements, together with the rotor disk 102, are shown in FIG. 2 and FIG. 3. As will further be explained underneath, the particular cooperation between the shifting element 105 and the coupling element 106 provides for a unique synchronisation mechanism, ensuring a synchronous displacement of the two rotor disks 101 and 102.

Figure 4:
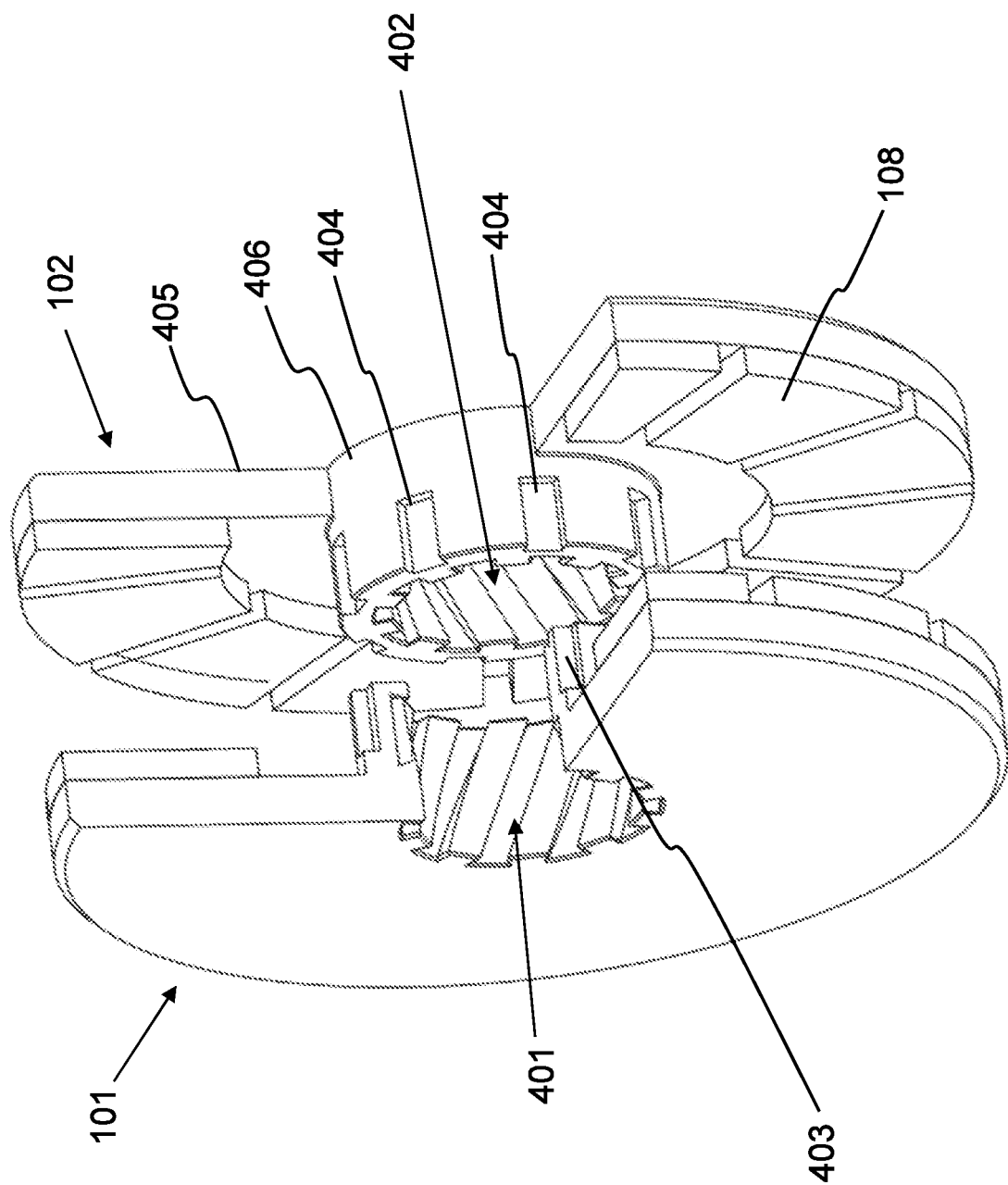
FIG. 4 shows a three-dimensional representation of a first and a second rotor disk according to an embodiment of the invention.

FIG. 4 shows the first rotor disk 101 and the second rotor disk 102, being separated from the other machine components. As is indicated on the figure for the second rotor disk 102, a rotor disk comprises a ring-shaped portion 405 and cylindrical portion 406. The cylindrical portion 406 protrudes from the surface of the ring-shaped portion 405. The ring-shaped portion 405 carries the permanent magnets 108. In order to contribute to the synchronisation mechanism, the rotor disks 101, 102 comprise two particular features. First, each rotor disk 101, 102 comprises a spline 401, 402, also referable as a mating element 401, 402, provided on the inner surface of the cylindrical portion 406. The splines 401, 402 are adapted to mesh with the shifting element 105, as will be described in detail below. In the shown embodiment, the spline 401, 402 is a helical spline, comprising grooves defining a helical path along the cylindrical inner surface. Secondly, each rotor disk 101, 102 comprises a spline 403, 404, provided on the outer surface of the cylindrical portion 406. The splines 403, 404 are adapted to mesh with the coupling element 106, as will be described in detail below. In the shown embodiment, the splines 403, 404 are provided as straight grooves 403, 404 extending in axial direction.

Figure 5:
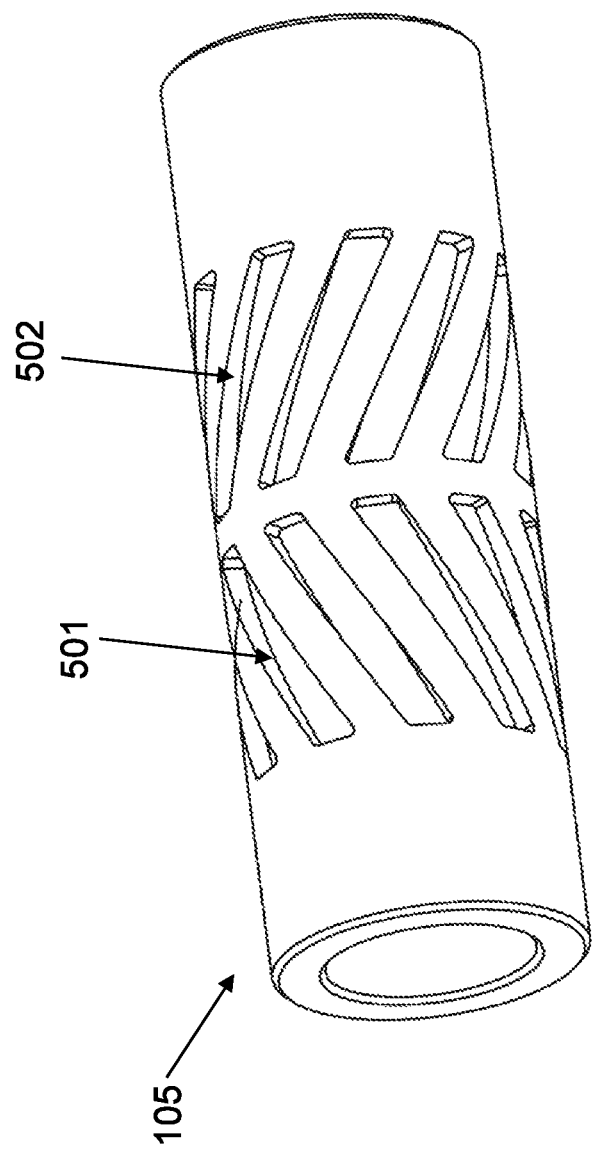
FIG. 5 shows a three-dimensional representation of a shifting element according to an embodiment of the invention.
Figure 6:
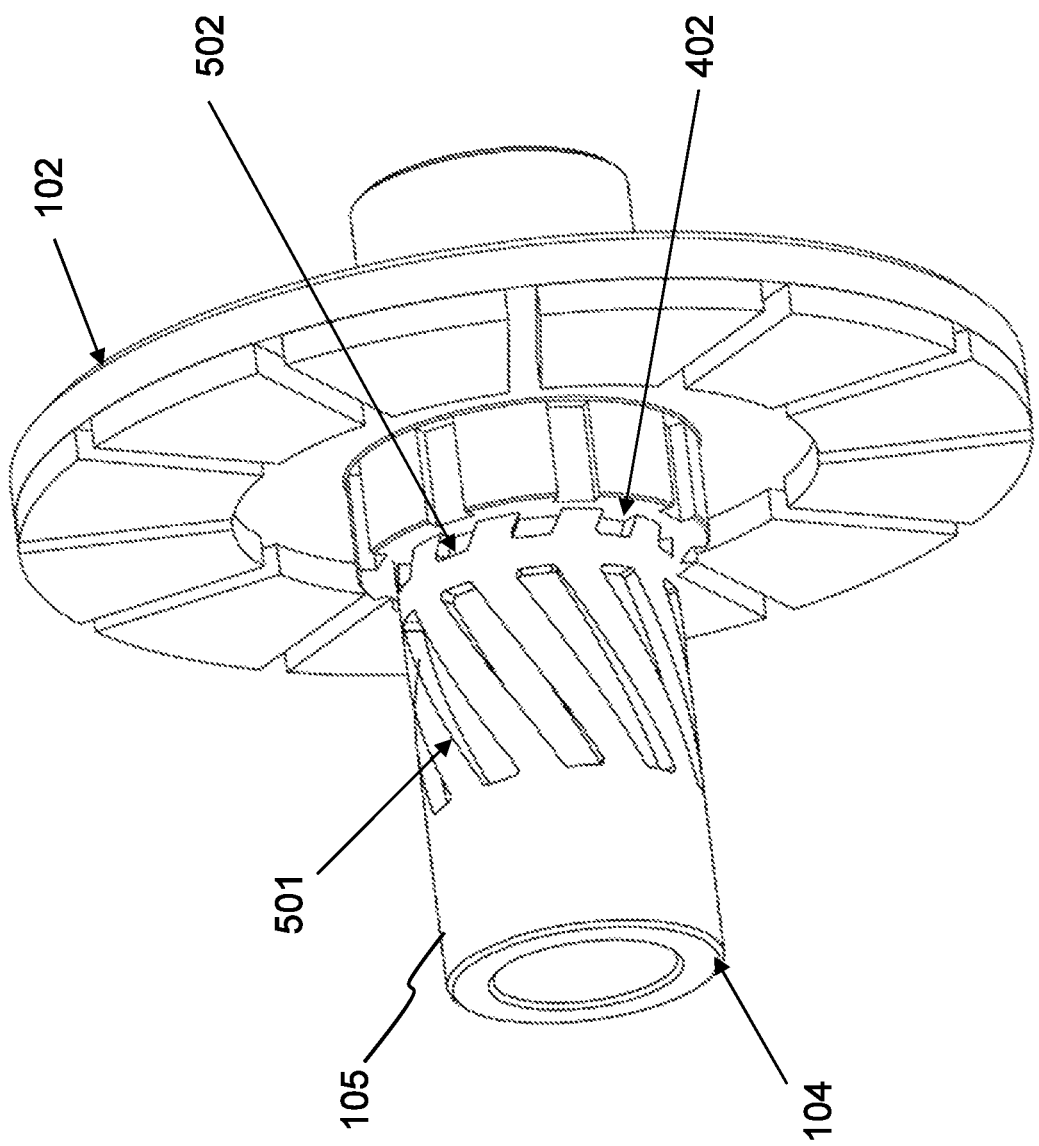
FIG. 6 shows a three-dimensional representation of a rotor disk mounted on a shifting element, according to an embodiment of the invention.

FIG. 5 individually shows the shifting element 105. In the shown embodiment, the shifting element 105 is integrated in the rotor shaft 104, meaning that it is part of the rotor shaft 104, as is also clear from FIG. 1. The shifting element 105 comprises a first guiding spline 501 and a second guiding spline 502, embodied as grooves in the cylindrical outer surface of the shifting element 105. The path of the first guiding spline 501 describes a left-handed helix, and the path of the second guiding spline 502 describes a right-handed helix, both having the same pitch. The first guiding spline 501 of the shifting element 105 is adapted to mesh with the corresponding spline 401 of the first rotor disk 101. In other words, the first guiding spline 501 of the shifting element 105 and the spline 401 of the first rotor disk 101, together form a first pair of mechanical mating elements, thereby mating the first rotor disk 101 and the shifting element. Analogously, the second guiding spline 502 of the shifting element 105 and the spline 402 of the second rotor disk 102, together form a second pair of mechanical mating elements, thereby mating the second rotor disk 101 and the shifting element 105. This is further illustrated in FIG. 6, where the second rotor disk 102 is shown, mounted on the shifting element 105.

The pairs of mechanical mating elements 501-401 and 502-402 define the trajectory that a rotor disk 101, 102 may follow when moving relatively to the shifting element 105. Indeed, when changing the angular position of a rotor disk 101, 102 relatively to the shifting element 105, the rotor disk 101, 102 moves axially with respect to the shifting element 105. Moreover, the pairs of mating elements 501-401 and 502-402 are chosen such that an equal rotation of the first 101 and the second rotor disk 102 relative to the shifting element 105 results in an equally sized but opposite axial displacement of the rotor disks 101, 102.

Figure 7:
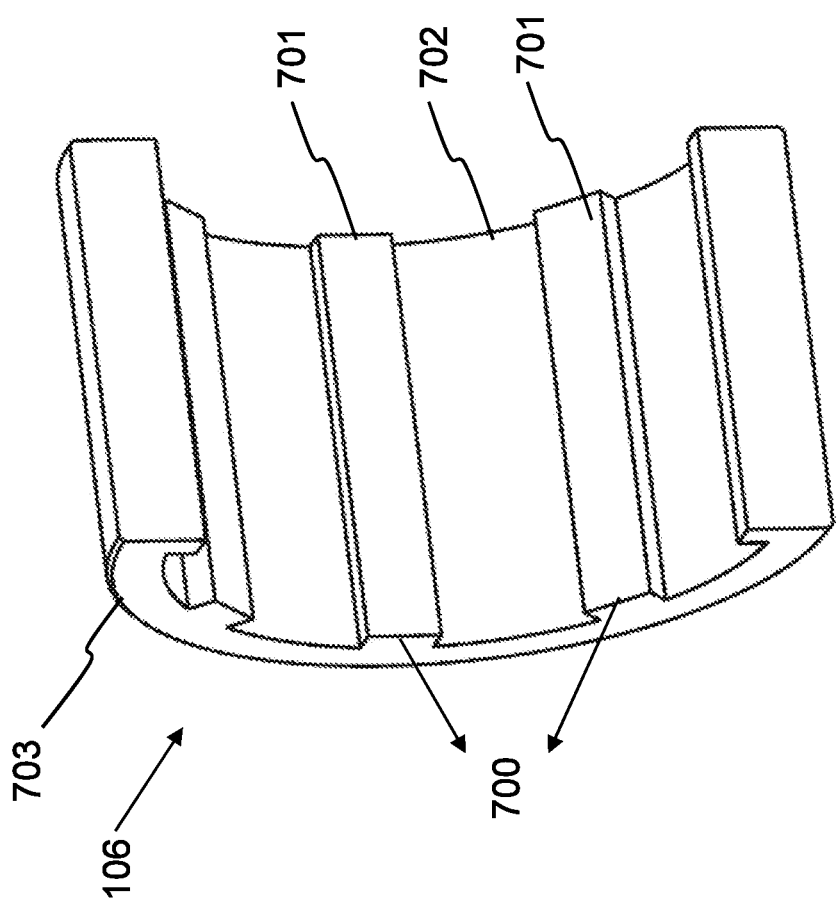
FIG. 7 shows a three-dimensional representation of a coupling element according to an embodiment of the invention. For clearness of representation, the coupling element has been intersected in the drawing, showing only half of the element.

FIG. 7 individually shows the coupling element 106. In the shown embodiment, the coupling element 106 has a cylindrical shape, comprising a cylindrical sleeve 703 as an outer surface, and comprising a third guiding spline 700 provided on the inner surface. The third guiding spline 700 comprises straight ribs 701 extending in axial direction, alternating with straight grooves 702. The third guiding spline 700 is adapted to mesh with the corresponding splines 403 and 404 comprised in the first rotor disk 101 respectively the second rotor disk 102. This is illustrated in FIG. 8, showing that the straight ribs 701 of the coupling element 106 may slide in the straight grooves 403, 404 of the rotor disks, thereby establishing a tongue-and-groove type of connection between the coupling element 106 and the first respectively second rotor disk 101, 102. On the one hand, the coupling element 106 mechanically connects or couples the two rotor disks 101, 102. On the other hand, the coupling element 106, together with the corresponding splines 403, 404 on the rotor disks, defines a specific trajectory when moving the rotor disks 101, 102 relatively to coupling element 106. Indeed, the coupling is such that an axial displacement of the first rotor disk 101 relative to the second rotor disk 102 is possible while a rotation of the first rotor disk 101 relative to the second rotor disk 102 is blocked. This is illustrated in FIG. 8, wherein (a) shows a condition with the two rotor disks 101, 102 close to each other, and (b) a condition after displacing the rotor disks 101, 102 away from each other.

In FIG. 3, the assembly formed by the shifting element 105, the coupling element 106 and the rotor disks 101, 102 is illustrated. For clearness of representation, only one rotor disk 102 is shown. In the shown embodiment, the coupling element 106 and the shifting element 105 are mounted coaxially, having a central axis corresponding to the rotational axis 110, with the shifting element 105 positioned internally with respect to the coupling element 106. The shown elements together provide a unique synchronisation mechanism, wherein the shifting element 105 allows to axially move the rotor disks 101, 102 while rotating relatively to the shifting element 105, and the coupling element 106 guaranties that the angular position of both rotor disks 101, 102 always remains the same. In this way, the rotor disks 101, 102 will move synchronously, in axial direction over the same distance but in opposite sense.

Figure 9:
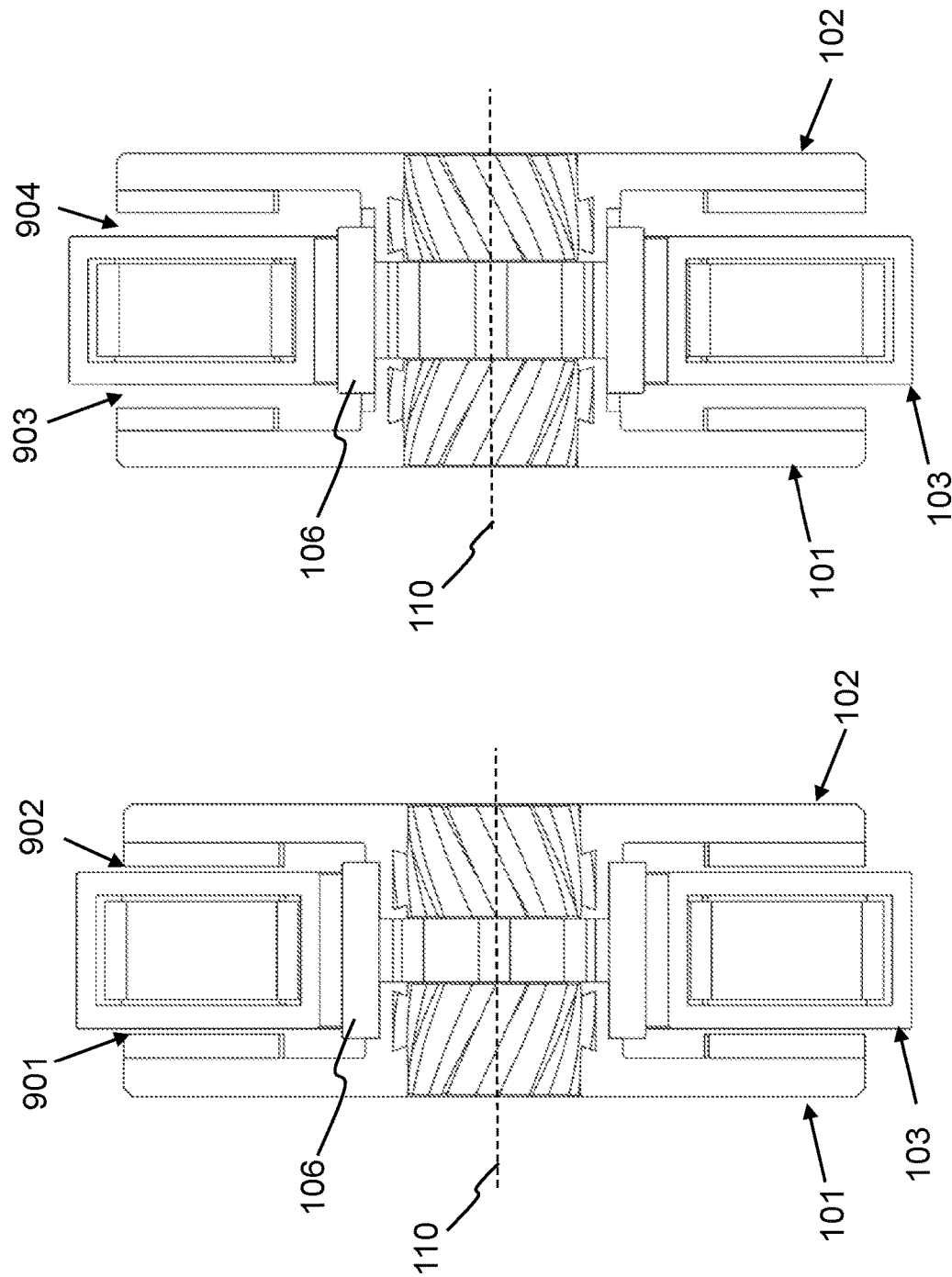
FIG. 9, including

FIG. 9 further illustrates the effect of the provided synchronisation mechanism. FIG. 9 (a) shows a condition in which the rotor disks 101, 102 are positioned closely to the stator 103, leaving a small air gap 901, 902 on both sides of the stator 103. Typically, this corresponds to a high-torque low-speed operation of the axial flux motor. FIG. 9 (b) shows another condition in which the rotor disks 101, 102 are positioned further away from the stator 103, leaving a larger air gap 903, 904 on both sides of the stator 103. In this mode, the permanent magnetic field in the stator 103 is weakened, thus allowing for a low-torque high-speed operation of the axial flux motor. Due to the synchronous movement of both rotor disks 101, 102 during repositioning, the air gaps 901 and 902, respectively 903 and 904, always have the same length. Consequently, the use of the described synchronisation mechanism enables mechanical field weakening to be applied in an axial flux motor with a 'one stator–two rotors' topology.

Figure 10:
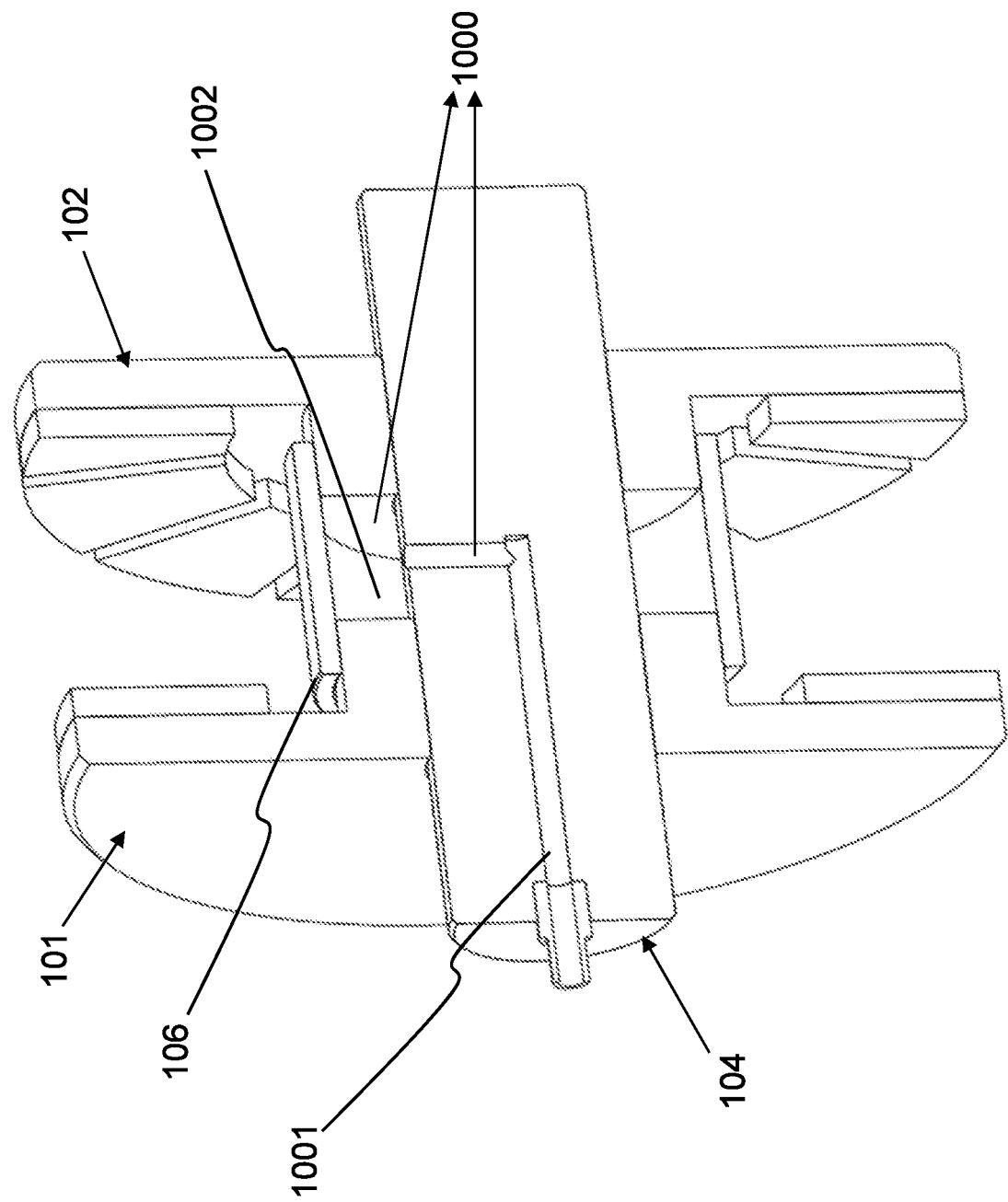
FIG. 10 and FIG. 11 show a cross-section according to a plane comprising the rotational axis, of a motor shaft and a coupling element mounted on two rotor disks, according to an embodiment of the invention, and illustrates the use of a hydraulic actuator for initiating the displacement of the rotor disks.
Figure 11:
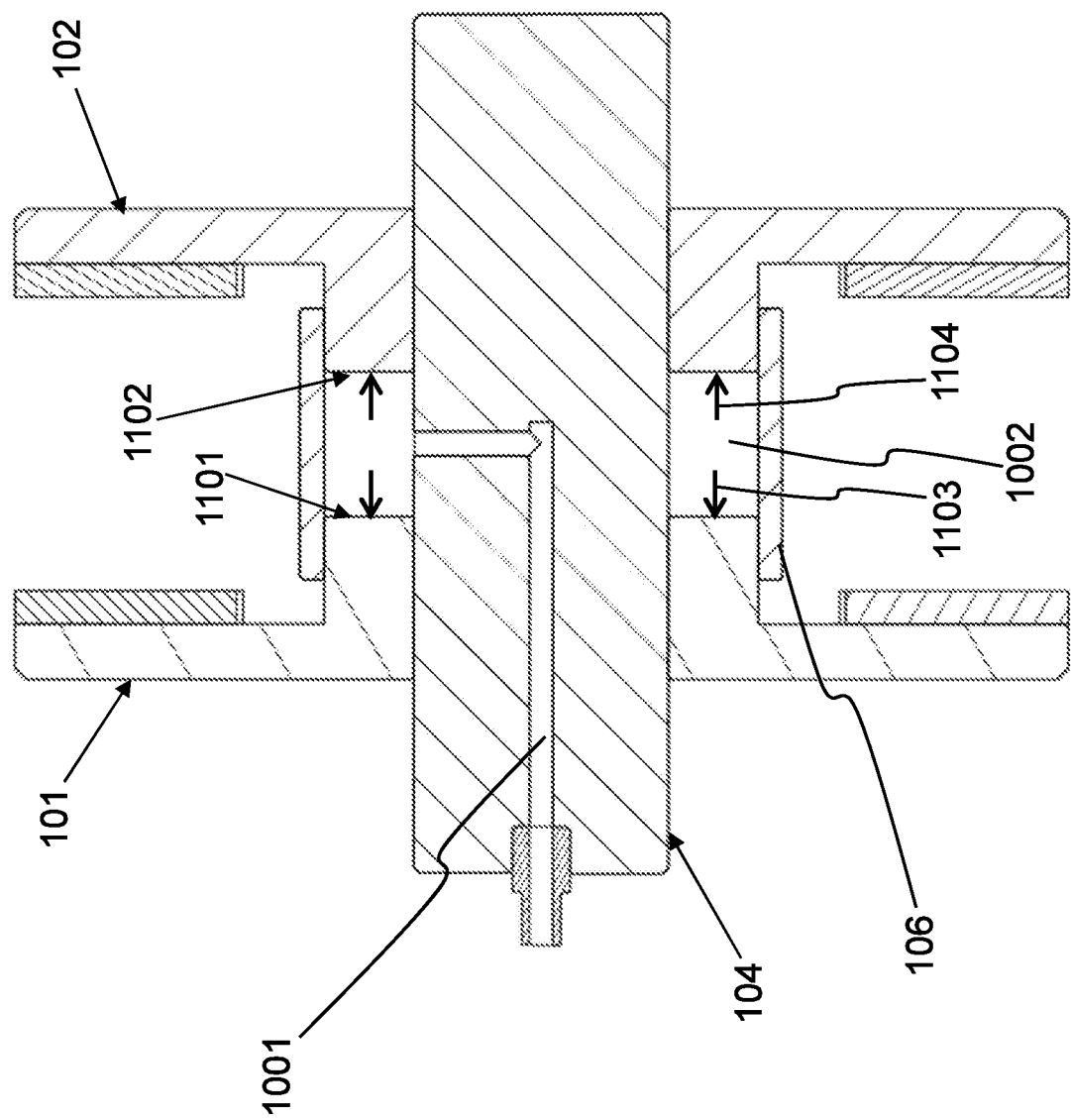

FIG. 10 and FIG. 11 illustrates the use of a hydraulic actuator 1000 in an axial flux machine according to the embodiment described in the previous figures. The actuator 1000 comprises a fluid chamber 1002 and a fluid supply 1001. The fluid supply 1001 is implemented as a bore in the motor shaft 104, through which a hydraulic fluid under pressure is supplied to the fluid chamber 1002. The bore 1001 runs through one half of the shaft length, and may connect to a hydraulic coupling at one end of the motor shaft 104. The fluid chamber 1002 comprises a first wall 1101 and a second wall 1102, which are positioned between the rotor disks 101, 102 and are connected to the first respectively second rotor disk 101, 102. The walls 1101 and 1102 are axially displaceable, meaning that their position relative to the motor shaft 104 may be changed according to the axial direction. Due to an increase of the hydraulic pressure, an axial force 1103, 1104 is exerted on the first respectively second wall 1101, 1102, thereby axially displacing the walls 1101, 1102, and increasing the volume of the fluid chamber 1002. Accordingly, the rotor disks 101, 102 are pushed apart, thereby initiating an axial movement of the rotor disks 101, 102. Due to the shifting element 105, this axial movement is accompanied by a change of the angular position of the rotor disks 101, 102 relative to the shifting element 105. Moreover, thanks to the synchronisation mechanism described above, both rotor disks 101, 102 will move away from each other in a synchronous way: even when initially the increased hydraulic pressure is absorbed by only one of the rotor disks, the synchronisation mechanism ensures that any initial movement of one rotor disk will automatically result in a synchronous movement of the other rotor disk. When decreasing the hydraulic pressure, such that the magnetic attraction force between a rotor disk 101, 102 and the stator prevails, the rotor disks 101, 102 will return to a position closer to the stator 103, again in a synchronous way. As is clear from the figure, only one hydraulic actuator 1000, using a single source of energy is present, thereby allowing for a simple integration in the machine.

Figure 12:
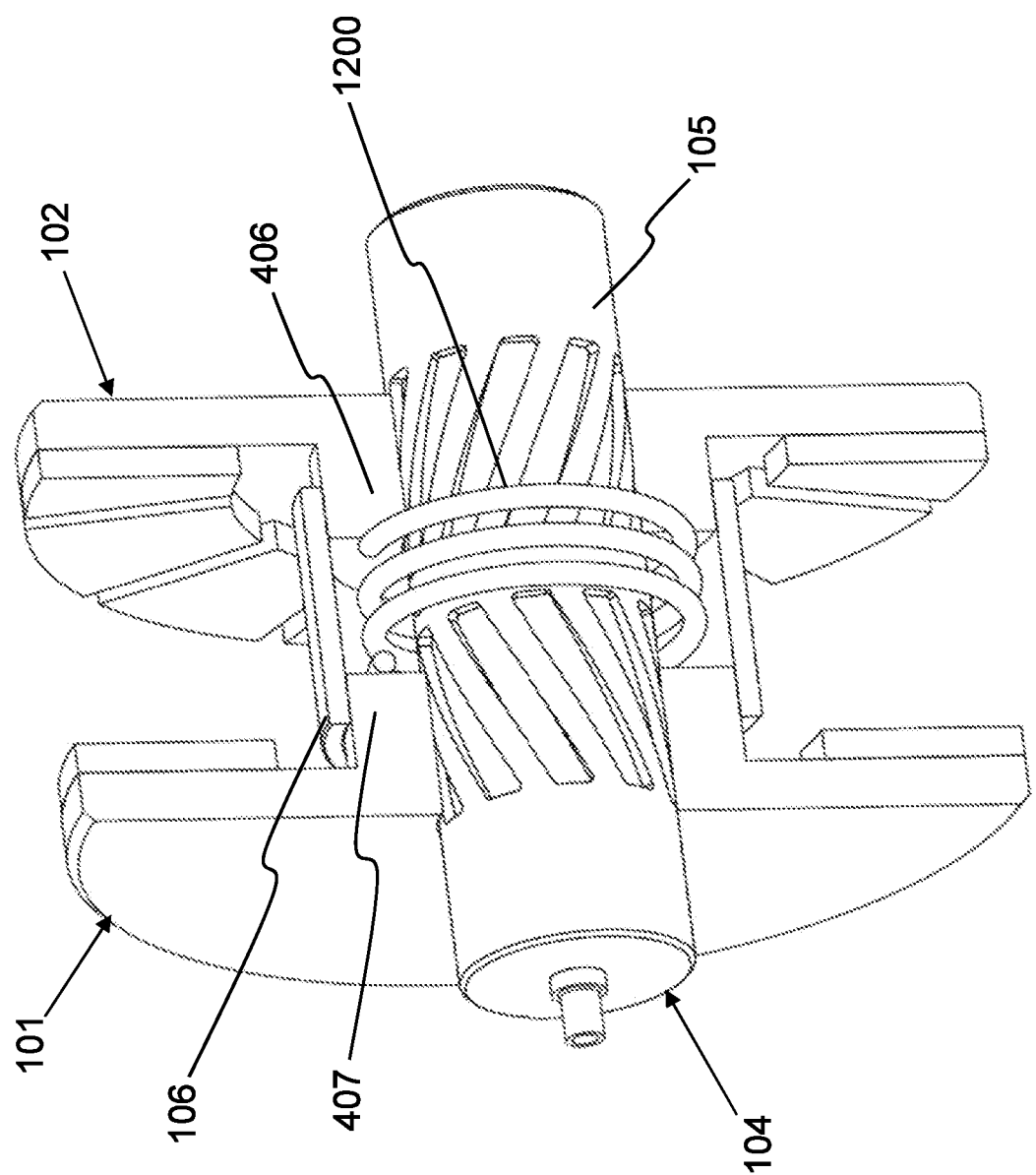
FIG. 12 shows a motor shaft and a cross-section according to a plane comprising the rotational axis of a coupling element mounted on two rotor disks, according to an embodiment of the invention, and illustrates the use of a spring, in addition to a hydraulic actuator.

FIG. 12 illustrates the use of a spring 1200, in addition to the hydraulic actuator 1000. In the shown embodiment, a helical spring 1200 is positioned between the cylindrical portions 407, 406 of the rotor disks 101, 102. The spring 1200 is in compressed condition, such that it pushes the first and second rotor disk 101, 102 apart. When used in combination with a hydraulic actuator 1000, the spring 1200 and hydraulic actuator 1100 together provide the axially force pushing the rotor disks 101, 102 apart. In another embodiment, not shown in the drawings, a spring like in FIG. 12 may be positioned between the rotor disks 101, 102, but without any actuator being present. In such a case, actuation may just rely on the change of torque from the rotor disks 101, 102 when evolving towards a high-speed low-torque operation or vice versa.

Figure 13:
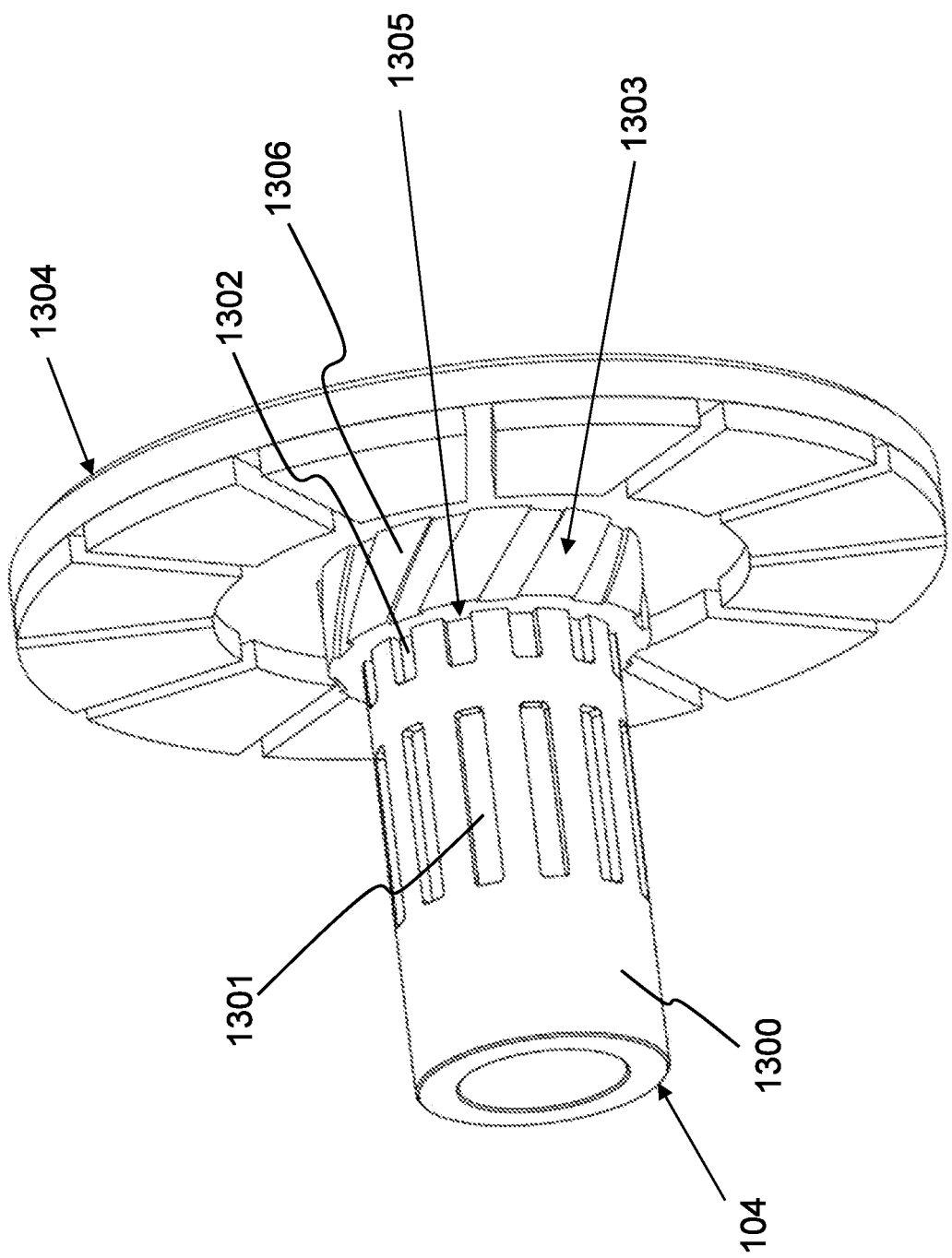
FIG. 13 shows a three-dimensional representation of a rotor disk mounted on a shifting element, according to another embodiment of the invention.

Finally, FIG. 13 shows another embodiment of the synchronisation mechanism. Compared to the first embodiment described in FIGS. 1 to 9, the position of the shifting element and the coupling element is switched. Indeed, in the second embodiment, shown in FIG. 13, the coupling element 1300 is integrated in the motor shaft 104. The coupling element 1300 comprises a guiding spline, embodied as straight grooves 1301, 1302 extending in axial direction. The straight grooves 1302 are adapted to mesh with corresponding straight ribs 1305, the latter being provided on the inner surface of the cylindrical portion 1306 of the second rotor disk 1304. Similarly, the straight grooves 1301 are adapted to mesh with straight ribs comprised in the first rotor disk, the latter not being shown in FIG. 13. Moreover, the rotor disk 1304 comprises a spline 1303, provided as teeth describing a helical path on the outer surface of the cylindrical portion 1306 of the second rotor disk 1304. The spline 1303 is adapted to mesh with a corresponding guiding spline provided on the shifting element. The shifting element is not shown on FIG. 13, but it is clear from the figure that the shifting element may have a cylindrical shape, with grooves describing a helical path provided on the inner surface, and may be mounted coaxially with the coupling element 1300. In this way, an assembly similar to the assembly of FIG. 3 is obtained, wherein the shifting element of the second embodiment has a position similar to the coupling element 106 of the first embodiment, and the coupling element 1300 of the second embodiment has a position similar to the shifting element 105 of the first embodiment.

Although the present invention has been illustrated by reference to specific embodiments, it will be apparent to those skilled in the art that the invention is not limited to the details of the foregoing illustrative embodiments, and that the present invention may be embodied with various changes and modifications without departing from the scope thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein. In other words, it is contemplated to cover any and all modifications, variations or equivalents that fall within the scope of the basic underlying principles and whose essential attributes are claimed in this patent application. It will furthermore be understood by the reader of this patent application that the words "comprising" or "comprise" do not exclude other elements or steps, that the words "a" or "an" do not exclude a plurality, and that a single element, such as a computer system, a processor, or another integrated unit may fulfil the functions of several means recited in the claims. Any reference signs in the claims shall not be construed as limiting the respective claims concerned. The terms "first", "second", third", "a", "b", "c", and the like, when used in the description or in the claims are introduced to distinguish between similar elements or steps and are not necessarily describing a sequential or chronological order. Similarly, the terms "top", "bottom", "over", "under", and the like are introduced for descriptive purposes and not necessarily to denote relative positions. It is to be understood that the terms so used are interchangeable under appropriate circumstances and embodiments of the invention are capable of operating according to the present invention in other sequences, or in orientations different from the one(s) described or illustrated above.

The invention claimed is:

1. An axial flux machine comprising:
   a shaft having a rotational axis in axial direction;
   a stator having a central axis corresponding to the rotational axis, and comprising a plurality of coils, and
   a rotor comprising a first and a second rotor disk having a central axis corresponding to the rotational axis,
   wherein the first and the second rotor disk are mounted on both sides of the stator, each of the rotor disks being axially separated from the stator by an air gap and comprising permanent magnets,
   wherein the rotor comprises:
   a shifting element, rotatably mounted while secured in axial direction relative to the stator;
   a first and a second pair of mechanical mating elements, adapted to mate the shifting element and the first respectively second rotor disk, and enabling an axial displacement of the first respectively second rotor disk relative to the shifting element by rotating the first respectively second rotor disk relative to the shifting element,
   wherein an equal rotation of the first and the second rotor disk relative to the shifting element, results in an equally sized but opposite axial displacement of the first and second rotor disk relative to the shifting element;
   a coupling element, mechanically coupling the first and the second rotor disk, thereby blocking a rotation of the first rotor disk relative to the second rotor disk while allowing for an axial displacement of the first rotor disk relative to the second rotor disk, and
   wherein:
   the first respectively second pair of mechanical mating elements comprises a first respectively second guiding spline, adapted to mesh with a corresponding spline comprised in the first respectively second rotor disk, the first guiding spline and the second guiding spline both being comprised in a cylindrical surface of the shifting element;
   the coupling element comprises a third guiding spline, adapted to mesh with a corresponding spline comprised in the first respectively second rotor disk, the third guiding spline being comprised in a cylindrical surface of the coupling element;
   the shifting element and the coupling element are separate elements mounted coaxially, the cylindrical surface of the coupling and shifting element having a central axis corresponding to the rotational axis.

2. The axial flux machine according to claim 1, wherein the axial flux machine comprises an actuator, the actuator comprising one or more axially displaceable parts, and adapted to push the first and the second rotor disk apart by an axial movement of the one or more axially displaceable parts.

3. The axial flux machine according to claim 2, wherein the actuator comprises a first and a second axially displaceable wall, both positioned between the first and the second rotor disk,
wherein the first respectively second wall is in contact with the first respectively second rotor disk.

4. The axial flux machine according to claim 3, wherein the actuator comprises a fluid chamber adapted to receive a hydraulic fluid, and
wherein the fluid chamber comprises the first and the second axially displaceable wall, such that an axial displacement of the first and second rotor disk changes the volume of the fluid chamber.

5. The axial flux machine according to claim 4, wherein the volume of the fluid chamber is controlled based on a hydraulic pressure.

6. The axial flux machine according to claim 1, wherein the shifting element is separate from the coupling element, thereby allowing for a rotation of the shifting element relative to the coupling element during an axial displacement of the first and second rotor disk.

7. The axial flux machine according to claim 1, wherein the cylindrical surface comprising the first and second guiding spline faces the cylindrical surface comprising the third guiding spline.

8. The axial flux machine according to claim 1, wherein the shifting element is integrated in the shaft.

9. The axial flux machine according to claim 1, wherein the path of the first guiding spline describes a left-handed helix, and the path of the second guiding spline describes a right-handed helix.

10. The axial flux machine according to claim 1, wherein the third guiding spline is adapted to establish one or more tongue-and-groove connections between the coupling element and the first respectively second rotor disk.

11. The axial flux machine according to claim 1, wherein the third guiding spline comprises one or more straight ribs extending in axial direction, said one or more ribs being adapted to mesh with one or more straight grooves comprised in the first and second rotor disk and extending in axial direction.

12. The axial flux machine according to claim 1, wherein the rotor further comprises one or more springs positioned between the first and the second rotor disk, the one or more springs adapted to push the first and the second rotor disk apart.

13. A method for realizing mechanical field weakening in an axial flux machine, comprising:
providing an axial flux machine having a rotational axis in axial direction, the axial flux machine comprising a stator and a rotor, the stator having a central axis corresponding to the rotational axis and comprising a plurality of coils, and the rotor comprising:
a first and a second rotor disk having a central axis corresponding to the rotational axis,
wherein the first and the second rotor disk are mounted on both sides of the stator, each of the rotor disks being axially separated from the stator by an air gap and comprising permanent magnets,
a shifting element, rotatably mounted while secured in axial direction relative to the stator;
a first and a second pair of mechanical mating elements, mating the shifting element and the first respectively second rotor disk, the first respectively second pair of mechanical mating elements comprising a first respectively second guiding spline, adapted to mesh with a corresponding spline comprised in the first respectively second rotor disk, the first guiding spline and the second guiding spline both being comprised in a cylindrical surface of the shifting element;
a coupling element, mechanically coupling the first and the second rotor disk, and comprising a third guiding spline, adapted to mesh with a corresponding spline comprised in the first respectively second rotor disk, the third guiding spline being comprised in a cylindrical surface of the coupling element;
wherein the shifting element and the coupling element are separate elements mounted coaxially, the cylindrical surface of the coupling and shifting element having a central axis corresponding to the rotational axis;
axially moving the first rotor disk relative to the shifting element by the first pair of mechanical mating elements, due to rotating the first rotor disk relative to the shifting element, and
axially moving the second rotor disk relative to the shifting element by the second pair of mechanical mating elements, due to rotating the second rotor disk relative to the shifting element,
wherein an equal rotation of the first and the second rotor disk relative to the shifting element, results in an equally-sized but opposite axial displacement of the first and second rotor disk relative to the shifting element;
blocking a rotation of the first rotor disk relative to the second rotor disk by the coupling element during the axial displacement of the first and second rotor disk.

14. The method according to claim 13, further comprising:
providing an actuator comprising one or more axially displaceable parts;
axially moving the one or more axially displaceable parts, thereby pushing the first and second rotor disk apart.

* * * * *